United States Patent [19]
Kueppers

[11] Patent Number: 5,939,483
[45] Date of Patent: Aug. 17, 1999

[54] LOW APPLICATION TEMPERATURE HOT MELT WITH EXCELLENT HEAT AND COLD RESISTANCE

[75] Inventor: Michelle C. Kueppers, Eagan, Minn.

[73] Assignee: H.B. Fuller Licensing & Financing, Inc., St. Paul, Minn.

[21] Appl. No.: 08/892,149

[22] Filed: Jul. 14, 1997

Related U.S. Application Data

[63] Continuation-in-part of application No. 08/678,799, Jul. 12, 1996, abandoned.

[51] Int. Cl.⁶ .............................. C08L 91/06; C08L 93/04; C08L 53/02; C08K 5/12
[52] U.S. Cl. ....................... 524/487; 524/271; 524/274; 524/292; 524/293; 524/478; 524/488; 524/489; 524/490; 524/499; 524/505; 525/98; 525/99
[58] Field of Search ............................. 524/271, 274, 524/275, 277, 292, 293, 478, 487, 488, 489, 490, 491, 499, 505; 525/98, 99

[56] References Cited

U.S. PATENT DOCUMENTS

| | | | |
|---|---|---|---|
| 3,635,861 | 1/1972 | Russell | 524/271 |
| 4,345,349 | 8/1982 | Flanagan | 524/271 |
| 4,660,858 | 4/1987 | Flanagan | 412/8 |
| 4,712,808 | 12/1987 | Bek-Forrest et al. | 412/3 |
| 4,722,650 | 2/1988 | Allen et al. | 412/3 |
| 4,942,195 | 7/1990 | Flanagan et al. | 524/294 |
| 4,944,994 | 7/1990 | Flanagan | 428/290 |
| 5,001,179 | 3/1991 | Kauffman et al. | 524/275 |
| 5,041,482 | 8/1991 | Ornsteen et al. | 524/272 |
| 5,057,571 | 10/1991 | Malcolm et al. | 524/271 |
| 5,091,454 | 2/1992 | Arendt | 524/293 |
| 5,292,819 | 3/1994 | Diehl et al. | 524/314 |
| 5,372,870 | 12/1994 | Diehl et al. | 525/48 |
| 5,373,049 | 12/1994 | Ornstern et al. | 524/487 |
| 5,387,623 | 2/1995 | Ryan et al. | 523/124 |
| 5,399,627 | 3/1995 | Diehl et al. | 525/95 |
| 5,500,472 | 3/1996 | Liedermooy et al. | 524/272 |

FOREIGN PATENT DOCUMENTS

| | | | |
|---|---|---|---|
| 0279279 | 8/1988 | European Pat. Off. | |
| 0358907 | 3/1990 | European Pat. Off. | |
| 0413137 A2 | 2/1991 | European Pat. Off. | |
| 3705992 | 8/1987 | Germany | 524/487 |
| 0013719 | 1/1980 | Japan | 525/98 |
| 0013727 | 1/1980 | Japan | 525/98 |
| 0048779 | 3/1987 | Japan | 524/275 |
| WO 96/03470 | 2/1996 | WIPO | |

*Primary Examiner*—Peter A. Szekely
*Attorney, Agent, or Firm*—Nancy N. Quan

[57] ABSTRACT

A hot melt useful for packaging comprising a) from about 10% to about 40% by weight of a block copolymer; b) up to about 20% of a compatible polymer wherein the total polymer content does not exceed 40% by weight; c) from about 25% to about 60% by weight of at least one tackifying resin; d) from about 5% to about 25% by weight of a compatible plasticizer; and e) from about 10% to about 40% by weight of at least one wax component wherein the viscosity of the hot melt adhesive is less than about 1500 cPs at about 150° C.

13 Claims, No Drawings

LOW APPLICATION TEMPERATURE HOT MELT WITH EXCELLENT HEAT AND COLD RESISTANCE

This application is a continuation-in-part of U.S. patent application Ser. No. 08/678,799 filed Jul. 12, 1996, now abandoned.

FIELD OF THE INVENTION

This invention relates to a low application temperature hot melt adhesive for the packaging industry which is based on a radial styrene-isoprene-styrene block copolymer and exhibits excellent heat and cold resistance.

BACKGROUND OF THE INVENTION

Hot melt adhesives are used widely in the packaging industry for such applications as case and carton sealing, tray forming, and box forming. The substrates to be bonded include virgin and recycled kraft, high and low density kraft, chipboard, and various types of treated and coated kraft and chipboard. Hot melts are required to exhibit full fiber tearing bonds. This means that all the fiber must be removed from the substrate along the entire length of the adhesive bead when the bond is separated by hand. Generally, in order to get full fiber tearing bonds, hot melts need to be applied at temperatures of about 175° C. The most commonly used application equipment is that which uses a piston pump or gear pump extrusion system. Such equipment is manufactured by Nordson, ITW or Slautterback. Sometimes an adhesive may not give sufficient fiber tearing bonds. In addition to the requirement that the adhesive give full fiber tearing bonds, customers are demanding higher performance in hot melt adhesives such as good thermal stability. Thermal stability generally means that the product will not darken in the glue pot with prolonged aging, will not produce char, skin, or gel, and will not have a substantial viscosity change over time. High application temperatures can cause degradation which leads to char, skin, and gel formation, discoloration, and viscosity changes. Therefore, lowering the application temperature is desirable because it can improve the thermal stability to a large extent. In addition to improving thermal stability, lowering the application temperature increases safety to workers by reducing the risk of burns, decreases the amount of electricity required to heat the adhesives which can result in savings in energy costs, decreases maintenance costs, and reduces the amount of odors and fumes coming from the adhesive. Decreasing the odor and fumes coming from the adhesive can be very appealing to customers, and to the employees who work in the plants which utilize the hot melt adhesives. Hot melt adhesives are typically applied at temperatures of about 175° C. For the aforementioned reasons, it is desirable to apply hot melt adhesives at temperatures of below about 155° C., and preferably about 135° C. to about 150° C. Commercial adhesives designed for application temperatures of about 135° C. to about 155° C. are currently available. These adhesives contain polymers with melt indices of at least 750 g/10 min. It should be recognized that adhesives for lower application temperatures still fall under the general category of hot melt adhesives. In designing products for low temperature application, it is necessary to use lower melting raw materials. This in turn requires that heat resistance is necessarily sacrificed because lower melting raw materials lead to lower melting adhesives which in turn cannot withstand temperatures as high as conventional hot melt packaging adhesives. It is therefore desirable to develop hot melt adhesives that can maintain excellent heat resistance while applied at low application temperatures.

U.S. Pat. No. 5,041,482 to Ornsteen et al. issued Aug. 20, 1991 discloses that glue stick adhesives for use in glue guns can be applied at application temperatures in the 82° C. to 138° C. range, and preferably less than 121° C. Ornsteen teaches the use of backbone polymers that have a melt index in excess of 750 g/10 min., such as ethylene vinyl acetate, polyethylene, and polypropylene. Additionally, glue stick adhesives are higher in viscosity and will not work in piston pump or gear pump extrusion equipment like those manufactured by Nordson, ITW or Slautterback. This type of equipment is used widely in the packaging industry for applying adhesives via an extrusion method. Piston pump or gear pump extrusion equipment requires a much lower viscosity than that which can be used in a glue gun. Therefore, glue sticks would not be used in Nordson type hot melt application equipment.

U.S. Pat. No. 5,373,049 to Ornsteen et al. issued Dec. 13, 1994 teaches cool melt adhesives designed with backbone polymers having a melt index of at least 750 g/10 min. Polymers with melt indices of lower than 650 g/10 min. may be used in combination with said polymer but not as the sole polymer in the formula. In fact, Ornstern discusses that traditional hot melt adhesives have polymers with melt indices in the 1.5 to 550 g/10 min. range making them not amenable for application processes operating at temperatures of below 150° C. due to high viscosities. Ornstern also teaches the use of ethylene vinyl acetate polymers, polyethylene, and polypropylene as backbone polymers and not the use of radial styrene-isoprene-styrene block copolymers which have melt indices of less than 100 g/10 min., and often less than 10 g/min.

U.S. Pat. No. 5,550,472 to Liedermooy et al. issued Mar. 19, 1996 discloses a low application temperature hot melt based on ethylene n-butyl acrylate having a melt index of at least 600; a terpene phenolic tackifying resin; a low melting point synthetic Fischer-Tropsch wax; and a polymer additive of ethylene vinyl acetate, ethylene methyl acrylate, ethylene acrylic acid, polyethylene, polypropylene, poly-(butene-1-co-ethylene), and lower melt index ethylene n-butyl acrylate copolymers. This patent does not teach how to make hot melt adhesives using as the base polymer, a block copolymer having a melt index of less than about 100 g/10 min.

U.S. Pat. No. 5,292,819 to Diehl et al., issued Mar. 8, 1994, discloses and claims the use of a radial styrene-isoprene-styrene (S-I-S) block copolymer having the general configuration (pI-pS-pB)$_n$X where n is a number greater than 2 for use in various hot melt applications such as for disposable articles. Diehl is directed toward pressure sensitive adhesives which are slow setting, and lack the heat resistance required for most packaging applications.

U.S. Pat. No. 5,372,870 to Diehl et al. issued Dec. 13, 1991 also discloses and claims the use of the same radial SIS block copolymer as above, for use in adhesives. Diehl discloses and claims up to 5% based on the weight of the composition of a hydrocarbon wax sufficient to form an adhesive composition useful for lining magazines or books, or for packaging and carton sealing. It is neither suggested nor contemplated to use more than 5% wax. In fact, those compositions exemplified in Diehl comprise 20% of a plasticizer with no wax. These compositions have a slow rate of set and higher viscosities. Furthermore, those compositions exemplified in Diehl are pressure sensitive adhesives which have an indefinite open time.

U.S. Pat. No. 5,399,627 to Diehl et al., issued Mar. 21, 1995 again discloses and claims the block copolymer above for use in hot melt adhesives for tapes. The physical characteristics for a hot melt tape adhesive are vastly different than the physical characteristics required of a hot melt packaging adhesive. Diehl teaches hot melt adhesives that have viscosities of greater than about 25,000 cPs at about 175° C. These adhesives are much too high in viscosity for application temperatures of less than about 155° C., and could not be run on standard packaging equipment which generally requires adhesives having viscosities of about 1,000 cPs at application temperature. Tape adhesives are also pressure sensitive having desirable characteristics such as tack at ambient temperatures which allows the tape to be adhered with hand pressure. Such adhesives contain no wax component. These adhesives would be too slow and would lack the heat resistance required for most packaging applications.

European Pat. Application 0,413,137,A2 published Feb. 20, 1991 teaches the use of a substantially radial styrene-butadiene block copolymer for use in a polyethylene terephthalate bottle assembly. These adhesives are applied at temperatures of at least 175° C. making the viscosities of the products used in the polyethylene terephthalate bottle assembly too high in viscosity for application temperatures of less than about 155° C.

Although block copolymers, in combination with a tackifying resin and a wax have been used in the packaging industry, current products are too high in viscosity lo be applied at low temperatures, requiring temperatures in excess of 175° C., and even in excess of 185° C. This causes severe stability problems leading to char and gel which in turn results in clogged nozzles.

There remains a need in the packaging industry for block copolymer based adhesives that have fast rates of set and can be applied at low temperatures. Improved cold temperature flexibility and resistance, improved heat resistance and superior adhesion to a variety of substrates can be achieved with block copolymer based adhesives having, low viscosities as compared to ethylene copolymer based counterparts.

The present inventor has now discovered a hot melt adhesive utilizing a unique combination of a block copolymer, a tackifying resin, a wax and a plasticizer that can be used in applications where the application temperature is less than about 155° C. and preferably less than about 150° C. and overcomes the aforementioned problems. It is a surprising result of the invention to achieve such low viscosities with block copolymer based adhesives, while maintaining excellent heat resistance and cold temperature flexibility.

SUMMARY OF THE INVENTION

The present invention discloses a hot melt packaging adhesive comprising a) from about 10% to about 40% by weight of a block copolymer; b) from about 0% to about 20% of a compatible polymer wherein the total polymer content does not exceed 40% by weight; c) from about 25% to about 60% by weight of at least one tackifying resin; d) from about 5% to about 20% by weight of a compatible plasticizer; and e) from about 10% to about 40% by weight of at least one wax component.

These compositions are characterized by viscosities of less than about 5000 cPs at about 150° C., preferably about 3000 cPs at about 150° C., more preferably less than about 1500 cPs at about 150° C. and even more preferably viscosities of less than about 1000 cPs at about 150° C. allowing them to be applied on standard extrusion type application equipment used in the packaging industry.

These compositions are characterized as nonpressure sensitive adhesives, having a fast rate of set of less than about 1 minute, preferably less than about 30 seconds, more preferably less than about 20 seconds and even more preferably less than about 15 seconds. They are further characterized by peel values (measured by the method on page 13 of this application) of greater than about 125° C. (about 52° F.) and preferably greater than about 135° C.(about 57° F.), resulting in improved heat resistance.

Furthermore, these adhesives exhibit superior adhesion to a variety of substrates, good cold temperature flexibility and good cold temperature resistance when utilized to bond substrates.

DETAILED DESCRIPTION OF THE PREFERRED EMBODIMENTS

The block copolymers useful herein may include A-B-A linear triblock copolymers, A-B linear diblock copolymers, A-B-A-B-A-B multiblock copolymers, radial block copolymers, and grafted versions thereof. The block copolymers typically have melt indices of less than about 100 g/10 min., and more typically have melt indices of less than 10 g/10 minute and are measure using ASTM D 1238 generally using condition P (5 kg @ 190° C. or condition G (5 kg @ 200° C.).

An example of a useful block copolymer is a radial styrene-isoprene-styrene radial block copolymer having the general configuration $(pS-pI-pB)_nX$ or $(pS-pI)_nX$ where pS is polystyrene, pI is polyisoprene, pB is polybutadiene, X is a residue of a multifunctional coupling agent used in the production of the radial block copolymer, and n is a number greater than 2 representing the number of branches appended to X which may also be referred to as arms. The number of branches is preferably 3 to 5, and more preferably 4. It is difficult to obtain a radial block copolymer however, that has as its composition only molecules with 4 branches. Some molecules with 3 branches and some molecules with 5 branches may also be present. It may also be possible that molecules with other than 3, 4, and 5 branches may be present. It is preferable that the radial block copolymer contains greater than about 60% of the 4 branch molecules. The number average molecular weight is from about 90,000 to about 380,000, and preferably from about 100,000 to about 250,000. Although a preferred molecular weight range is specified for maintaining low viscosities and high heat resistance, a lower amount of a higher molecular weight polymer can be used to achieve the same viscosity range. Polymers having different molecular weights can also be blended to achieve the desired viscosity. The styrene content is from about 15% to about 35% of the radial block copolymer, and is preferably from about 20% to about 30%. The coupling efficiencies of these polymers are greater than about 60%, and preferably greater than about 70%. Useful polymers include Vector® DPX-550, DPX-551 and DPX-552 available from Dexco Polymers in Houston, Tex.; Kraton® D-1124 available from Shell Chemical Co. in Houston, Tex.; and Quintac® SH-108 and Quintac® 3450 available from Nippon-Zeon in Tokyo, Japan. All are radial styrene-isoprene-styrene polymers. The present inventors contemplate the use of any block copolymer that would achieve these same characteristics in the final composition. These polymers are useful in the range from about 10% to about 40% by weight in the adhesive, preferably from about 10% to about 30% by weight in the adhesive and more preferably from about 10% to about 20% by weight in the adhesive.

The tackifying resins useful herein may include aliphatic, cycloaliphatic and aromatic hydrocarbon resins and hydrogenated derivatives, and mixtures thereof; rosins and rosin derivatives, and terpenes and modified terpenes, and mixtures thereof. These tackifying resins have a Ring and Ball softening point of between about 70° C. and about 150° C. These tackifying resins are available with differing levels of hydrogenation. Useful examples include Eastotac® H-100 and H-130 from Eastman Chemical Company in Kingsport, Tenn. which are partially hydrogenated cycloaliphatic petroleum hydrocarbon resin with different softening points; Escorez® 5300 and Escorez® 5400, partially hydrogenated cycloaliphatic petroleum hydrocarbon resins, and Escorez® 5600, a partially hydrogenated aromatic modified petroleum hydrocarbon resin all available from Exxon Chemical Company in Housion, Tex.; Wingtack® Extra which is an aliphatic, aromatic petroleum hydrocarbon resin available from Goodyear Chemicals; Hercolite® 2100 which is a partially hydrogenated cycloaliphatic petroleum hydrocarbon resin available from Hercules in Wilmington, Del.; Zonatac® 105 Lite which is a styrenated terpene hydrocarbon resin, made from d-limonene and available from Arizona Chemical Co. in Panama City, Fla.; Sylvatac® 1103 available from Arizona Chemical Co., Unitac® R-100 Light available from Union Camp in Wayne, N.J. and Permalyn® 305 available from Hercules which are all pentaerythritol rosin esters; and Nirez® V-2040, a terpene phenolic resin available from Arizona Chemical. These tackifiers are useful in the range from about 30% to about 60% by weight in the adhesive and preferably from about 40% to about 60% by weight in the adhesive.

The compatible polymers useful herein may include A-B-A triblock (copolymers, and A-B diblock copolymers, A-B-A-B-A-B multiblock copolymers, and radial block copolymers, and grafted versions thereof; homopolymers, copolymers, and terpolymers of ethylene; and propylene. Examples of useful compatible polymers include block copolymers having the general configuration A-B-A, having styrene endblocks and ethylene-butadiene midblocks, as described in Collins et al., U.S. Pat. No. 4,136,699, incorporated herein by reference, some of which are available under the tradename of Kraton® G cormmercially available from Shell Chemical Co., located in Houston, Tex. One skilled in the art would recognize that there are various grades of Kraton® G available for use. Some examples include Kraton® G-1726, Kraton® G-1657, Kraton® G-1652, and Kraton® G-1650, saturated A-B diblock/A-B-A triblock mixtures with ethylene-butadiene midblocks; Kraton® D-1112, a high percent A-B diblock linear styrene-isoprene-styrene polymer; Kraton® D-1107 and Kraton® D-1111, primarily A-B-A triblock linear styrene-isoprene-styrene polymers; Stereon® 840A and Stereon® 841A, an A-B-A-B-A-B multiblock styrene-butadiene-styrene polymer available from Firestone located in Akron, Ohio; Europrene® Sol T 193B a linear styrene-isoprene-styrene polymer available from Enichem Elastomers in New York, N.Y.; Europrene® Sol T 163, a radial styrene-butadiene-styrene polymer also available from Enichem Elastomers; Vector® 4461-D, a linear styrene-butadiene-styrene polymer available from Exxon Chemical Co. in Houston, Tex.; Vector® 4111, 4211, and 4411, fully coupled inear styrene-isoprene-styrene polymers containing different weight percentages of styrene endblock; and Vector® 4113, a highly coupled linear styrene-isoprene-styrene polymer also available from Exxon Chemical Co. Other polymers, such as homopolymers, copolymers and terpolymers of ethylene, and polypropylene are also useful as compatible polymers. Some examples include ethylene vinyl acetate copolymers such as Elvax® 410 and Elvax® 210 available from DuPont Chemical Co. located in Wilmington, Del.; Escorene® UL 7505 available from Exxon Chemical Co.; Ultrathene® UE 64904 available from Quantum Chemical Corp. in Rolling Meadows, Ill.; and AT 1850M available from AT Polymers & Film Co. in Charlotte, N.C. Other useful polymers include Exact® 5008, an ethylene-butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. located in Midland, Mich. Any of these polymers are useful in amounts from about 0% to about 20% by weight in the adhesive, preferably from about 0% to about 10% by weight in the adhesive and more preferably from about 0% to about 5% by weight in the adhesive.

The waxes useful herein may include paraffin waxes, microcrystalline waxes; high density low molecular weight polyethylene waxes, by-product polyethylene waxes, Fischer-Tropsch waxes, oxidized Fischer-Tropsch waxes and hydroxy stearamide waxes.

The paraffin waxes useful herein are those having a Ring and Bal softening point of about 55° C. to about 85° C. The preferred waxes are Okerin® 236TP available from Astor Wax Corporation located in Doraville, Ga., Penreco® 4913 available from Pennzoil Products Co. in Houston, Tex. R-7152 Paraffin Wax available from Moore & Munger in Shelton, Conn., and Paraffin Wax 1297 available from International Waxes, Ltd in Ontario, Canada.

The microcrystalline waxes useful herein are those having about 50% by weight or more cyclo or branched alkanes with a length of between about 30 and 100 carbons. They are generally less crystalline than paraffin and polyethylene waxes, and have melt points of greater than about 70° C. Examples include Victory® Amber Wax, a 70° C. melt point wax available from Petrolite Corp. located in Tulsa, Okla.; Bareco® ES-796 Amber Waw, a 70° C. melt point wax available from Bareco in Chicago, Ill.; Okerin® 177, an 80° C. melt point wax available from Astor Wax Corp.; Be Square® 175 Amber Wax, an 80° C. melt point microcrystalline wax, Be Square® 185 Amber Wax, an 85° C. melt point microcrystalline wax, and Be Square® 195 Amber Wax, a 90° C. melt point wax all available from Petrolite Corp.; Indramic® 91, a 90° C. melt point wax available from Industrial Raw Materials located in Smethport, Pa.; and Petrowax® 9508 Light, a 90° C. melt point wax available from Petrowax Pa., Inc. located in New York, N.Y.

The synthetic high melting waxes useful are high density, low molecular weight polyethylene waxes, by-product polyethylene waxes and Fischer-Tropsch waxes. These waxes generally have melting points of greater than about 90° C. Preferred waxes include Petrolite® C-4040, Polywax® 1000, 2000 and 3000, low molecular weight polyethylene waxes available from Petrolite Corp.; Escomer® H-101, a modified polyethylene wax available from Exxon Chemical Co. in Houston, Tex.; Marcus® 100, 200 and 300, low molecular weight polyethylene by-product waxes available from Marcus Chemical Co., a Division of H.R.D. Corp. located in Houston, Tex.; and Paraflint® H-1, H-4, and H-8, Fischer-Tropsch waxes available from Sasol-SA/Moore & Munger in Shelton, Conn. The waxes are useful in amounts from about 10% to about 40% by weight in the adhesive, preferably from about 15% to about 40% by weight in the adhesive and more preferably from about 20% to about 40% by weight in the adhesive and may be used in any combination.

A fluid ingredient may be used in the formulations of the present invention. Such fluid ingredients may be provided as plasticizers, liquid resins, liquid elastomers, or any other material which flows at ambient temperatures and is compatible with the block copolymer.

The plasticizers useful herein may include mineral or petroleum based hydrocarbon oils, polybutene, liquid tackifying resins, liquid elastomers, or functionalized oils such as glyceryl trihydroxyoleate or other fatty oils. The oils used are primarily hydrocarbon oils which are low in aromatic content, and are paraffinic or naphthenic in character. The oils are also preferably low in volatility, transparent and have as little color and odor as possible. This invention also contemplates the use of olefin oligomers, low molecular weight polymers, vegetable oils and their derivatives and similar plasticizing liquids.

Examples of useful plasticizers include Calsol® 5120, a naphthenim petroleum based oil available from Calumet Lubricants Co. in Indianapolis, Ind.; Kaydol® White Mineral Oil, a paraffinic mineral oil available from Witco Corp. in New York, N.Y.; Parapol® 1300, a liquid butene homopolymer available from Exxon Chemical Co. in Houston, Tex.; Indopol® H-300, a liquid butene homopolymer, available from Amoco Corp. in Chicago, Ill.; Escorez® 2520, a liquid aromatic petroleum based hydrocarbon resin with a pour point of 20° C., available from Exxon Chemical Co.; Regalrez® 1018, a liquid hydrogenated aromatic hydrocarbon resin with a pour point of 18° C., available from Hercules, Inc. in Chicago, Ill.; and Sylvatac® 5N, a liquid resin of modified rosin ester with a pour point of 5° C., available from Arizona Chemical Co. in Panama City, Fla. One skilled in the art would recognize that any generic 500 second or 1200 second naphthenic process oil would also be useful. These plasticizers are useful in amounts from about 1% to about 20% by weight in the adhesive, preferably from about 5% to about 20% by weight in the adhesive, more preferably from about 10% to about 20% by weight in the adhesive and even more preferably from about 10% to about 15% by weight in the adhesive.

Solid plasticizer, such as solid benzoate plasticizers, may be optionally utilized. Examples of such plasticizers include Benzoflex® 352, a 1,4-cyclohexane dimethanol dibenzoate; Benzoflex® S-404, a glyceryl tribenzoate; and Benzoflex® S-552, a pentaerythritol tetrabenzoate all available from Velsicol Chemical Corp. in Rosemont, Ill. Such plasticizers can improve cold temperature resistance and wet out of the surface of a substrate by lowering adhesive viscosity. Liquid plasticizers are detrimental to the heat resistance of the adhesive whereas solid plasticizers are not. These plasticizers may be useful in amounts from about 0% to about 25% by weight in the composition.

A stabilizer or antioxidant is also preferably used in hot melt adhesives. These compounds are added to protect the adhesive from degradation caused by reaction with oxygen which is induced by such things as heat, light, or residual catalyst from the raw materials, for example from the tackifying resin. Such antioxidants are commercially available from Ciba-Geigy located in Hawthorne, N.Y. and include Irganox® 565, 1010 and 107 which are hindered phenols. These are prinary antioxidants which act as radical scavengers and may be used alone or in combination with other antioxidants such as phosphite antioxidants like Irgafos® 168 available from Ciba-Geigy. Phosphite catalysts are considered secondary catalysts, are not generally used alone, and are primarily used as peroxide decomposers. Other available catalysts are Cyanox® LTDP available from Cytec Industries in Stamford, Conn., ind Ethanox® 1330 available from Albemarle Corp. in Baton Rouge, La. Many other antioxidants are available for use by themselves, or in combination with other such antioxidants. These compounds are added to the hot melts in small amounts and have no effect on the other physical properties. Other compounds that could be added are pigments which add color, or fluorescing agents, to mention only a couple. Additives like these are known to those skilled in the art.

These compositions are characterized as being nonpressure sensitive hot melts having a fast rate of set. The rate of set is less than about 1 minute, preferably, less than about 30 seconds, more preferably less than about 20 seconds and even more preferably less than about 15 seconds. Pressure sensitive hot melts, in contrast, are characterized as haLving an indefinite open time.

The resultant adhesives are characterized by viscosities of less than about 5000 cPs at about 155° C., preferably by viscosities of less than about 3000 cPs at about 155° C., more preferably less than about 1500 cPs at about 155° C. and even more preferably less than about 1000 cPs at 155° C., allowing them to be applied to a variety of substrates at temperatures of less than about 155° C. Preferably the temperature of application is less than about 150°. The viscosities of the resultant adhesives are preferably less than about 5000 cPE at the temperature of application, preferably less than about 3000 cPs, more preferably less than about 1500 cPs and even more preferably less than about 1000 cPs at the temperature of application. Therefore, the preferable combination is a viscosity of less than about 1500 cPs at about 150° C. and the more preferable combination is a viscosity of less than about 1000 cPs at a temperature of application of less than about 150° C. The limiting factor for viscosity is the application equipment. Generally, extrusion type application equipment is used in the packaging industry where a bead of hot melt adhesive is applied to a first substrate and a second substrate is subsequently mated to the first substrate. This equipment is commonly made by such companies as Nordson Corp. located in Atlanta, Ga., Mercer Corp. and Slautterback Corp.

The adhesives are preferably further characterized by peels of greater than about 125° F. (about 52° C.) and more preferably greater than about 135° F. (about 57° C.) as measure by Test Method No. 2 on page 12 of this application. These adhesives therefore exhibit excellent heat resistance as measure by the peel values, excellent cold temperature flexibility and excellent bondability/adhesion to a wide range of substrates.

Due to the high molecular weights of block copolymers, it is usually difficult to obtain viscosities low enough for application on packaging equipment. Decreasing the amount of block copolymer in an adhesive decreases the flexibility leading to poor bonding performance at low temperatures of less than about 0° C. A surprising result of the invention is the ability to achieve such a low viscosity to allow the block copolymer based adhesive to be applied at very low temperatures while maintaining such excellent heat resistance, as measured by peel values, and cold temperature flexibility. Superior bonding performance is obtained with the adhesives of the present invention as measured by fiber tearing bonds at temperatures of between about −20° C. and 60° C.

These adhesives can be used in all kinds of extrusion type packaging operations for forming and closing cases, cartons and trays, where paper and paperboard are used such as various kinds of kraft paper and paperboard, and corrugated versions thereof. While most hot melt adhesives are capable of bonding such substrates, there is a lack of adequate hot melts where excellent adhesion is required. These adhesives are especially useful, therefore, where excellent adhesion to difficult substrates is required. Such substrates include polypropylene, polyethylene, glossy paperstock, coated paperstock, composite material such as a polyester or "mylar" film over a foil laminated to a chipboard carton to name only a few types.

The invention is further illustrated by the following non-limiting examples.

EXAMPLES 1–14, and COMPARATIVE EXAMPLES A–F

TEST METHODS

1. MELT VISCOSITIES

The melt viscosities of the hot melt adhesives were determined on a Brookfield Thermosel Viscometer Model LVDV 2+ using a number 21 spindle. The temperature utilized was about 150° C. (about 300° F.).

2. PEEL AND SHEAR

Peel and shear values were determined by placing samples in a programmed oven with 100 g weights used for the peel mode and 500 g weights used for the shear mode, and ramping the temperature up from 25° C. to 100° C. at 25° C./hour. The oven automatically recorded the temperature at which the samples failed. Each sample was coated onto kraft paper by hand using glass rods or shims. The resultant coating is a one inch wide band that is about 8–10 mils or about 0.008 to about 0.010 inches thick. Four to five bonds were made for the peel mode and four to five bonds were made for the shear mode and the results were averaged.

3. BONDING TESTS

Adhesive bonds were made on various substrates using an application temperature of about 150° C., an open time of 1 second, a set time of 1 second, and a bead size of 1/16 inch (0.16 cm) for the chipboard type substrates and 1/8 inch (0.32 cm) for the corrugated substrates. The resulting bonds were then conditioned for at least 24 hours at the different test temperatures, and then separated by hand and the amount of fiber tear was determined. A minimum of three samples were tested for each adhesive at each of the different temperatures and the adhesives were then rated using a system of poor, good or excellent. Poor bonds were those where a small amount or no fiber tear was observed, good bonds showed roughly half or more fiber tear and excellent bonds showed a substantial amount of fiber tear or close to full fiber tear.

The adhesive samples were prepared by first making a preblend of a 1:1 block copolymer to tackifier mixture using a high shear sigma blade mixer manufactured by Littleford Day located in Florence, Ky. The remaining tackifying resin, plasticizer, wax, and any other ingredient except the compatible polymer, are melted in an oven at temperatures of between about 150° C. and 175° C. The preblend and compatible polymer are then slowly added and mixed with the melted ingredients using an upright or lightening mixer such as the Stirrer Type RZRI manufactured by Caframo in Wiarton, Ontario, Canada. The sample is kept at temperatures of between about 150° C. and 175° C. using a heating mantle such as those manufactured by Glas-Col in Terre Haute, Ind. The antioxidant may be added during the melting phase, the mixing phase, or some during both phases.

TABLE 1

| Examples | 1 | 2 | 3 | 4 | 5 |
|---|---|---|---|---|---|
| DPX 552 | 15.0 | 15.0 | 15.3 | — | — |
| DPX 551 | — | — | — | 17.0 | 17.0 |
| Eastotac H-100R | 36.0 | 35.0 | — | — | — |
| Eastotac H-130R | 22.0 | 17.0 | — | — | — |
| Escorez 5600 | — | — | 15.3 | 56.0 | 44.0 |
| Escorez 5400 | — | — | 29.6 | — | — |
| 500 Sec. Process Oil | 10.0 | 11.0 | 11.2 | 10.0 | 12.0 |
| Paraffin Wax 155F | — | — | 6.1 | — | 5.0 |
| Microcrystalline Wax 195F | 15.0 | 20.0 | 16.4 | 15.0 | 16.0 |
| EnBA | — | — | 4.1 | — | 4.0 |
| Visc. @ about 150° C. (cPs) | 1470 | 1450 | 1160 | 1440 | 1100 |
| 100 g Peels (° C.) | 67 | 64 | 62 | 53 | 53 |

Table 1 illustrates the superior heat resistance as measured by the peel values and low viscosities obtained with Examples 1 through 5 of the present invention. To each of the above compositions was added 2 grams of a coextrusion coating, RM-6053, manufactured by the H. B. Fuller Co. located in St. Paul, Minn.

EXAMPLES 6–9 AND COMPARATIVE EXAMPLES A & B

|  | 6 | 7 | 8 | 9 |
|---|---|---|---|---|
| DPX 552 | 16.0 | 16.0 | 14.0 | — |
| DPX 551 | — | — | — | 14.0 |
| Escorez 5400 | 44.7 | 44.5 | 55.0 | 55.0 |
| Paraffin Wax 155F | 6.0 | 6.0 | — | — |
| 500 sec Process Oil | 11.0 | 11.0 | 9.5 | 9.5 |
| Ethylene n-butyl Acrylate (35-900) | 4.0 | — | 5.0 | 5.0 |
| Kraton G1726 | — | 4.0 | — | — |
| Microcrystalline Wax 195F | 16.0 | 16.0 | 14.0 | 14.0 |
| RM-6053 | 2.0 | 2.0 | 2.0 | 2.0 |
| Irganox 1010 | 0.3 | 0.5 | 0.5 | 0.5 |

TABLE 2

|  | 6 | 7 | 8 | 9 |
|---|---|---|---|---|
| Viscosity @ about 150° C. | 1400 | 1155 | 1270 | 1185 |
| 100 g Peels (° C.) | 66 | 58 | 59 | 62 |
| Bonding Tests (% Fiber Tear) |  |  |  |  |
| −20° C. (about 0° F.) | 0 | 50 | — | — |
| −30° C. (about −20° F.) | 0 | 70 | — | — |
| 4.5° C. (about 40° F.) | 100 | 100 | — | — |

Table 2 illustrates the superior bonding performance obtained with compositions of the present invention. Example 6 illustrates a high heat resistant product as measured by the peels, designed for performance at higher temperatures as further illustrated by the full fiber tearing bonds at temperatures of about 60° C. Example 7 illustrates a composition with superior bonding performance at low temperatures as illustrated by good fiber tearing bonds at about −20° C. and about −30° C. Examples 8 and 9 illustrate the high heat resistance and low viscosity obtained with the compositions of the present invention.

Table 3, following, illustrates the decrease in viscosity and the increase in the rate of set as the level of microcrystalline wax (having a melt point of about 90° C.), is increased from 0% to 15% wax by weight in the adhesive. It also illustrates that the preferred compositions, having 15% wax, have higher peel values. This was accomplished by first preparing 400 grams of a base composition utilizing a radial SIS block copolymer, Vector® DPX 552, and having no wax. This base composition which is Comparative Example A, was then divided into 4 samples. One sample, Comparative Example A, has no wax. Comparative Example B has 5 grams of wax which was added to 95 grams of the base composition. Example 10 has 10 grams of wax added to 90 grams of the base composition and Example 11 has 15 grams of wax added to the base composition. This same procedure was repeated for Comparative Examples C and D and comparative Examples G and H except that a linear SIS block copolymer, Kraton® 1117 was utilized. Viscosities were run at about 150° C. (about 300° C.). Peel data and open and set times were also run on each of the samples. This testing illustrates that samples having less than about 10% wax are too high in viscosity and set to slowly for utilization in the packaging industry on high speed extrusion type application equipment.

Base Composition
24.8% Block Copolymer
54.6% Zonatac® 105 lite—styrenated terpene tackifying resin
19.9% 500 second process oil
0.7% Irganox® 1010—hindered phenolic antioxidant

TABLE 3

|  | Comparative | | | | Comparative | | | |
| --- | --- | --- | --- | --- | --- | --- | --- | --- |
|  | A | B | 10 | 11 | C | D | E | F |
| Vector ® DPX552 | ✓ | ✓ | ✓ | ✓ | — | — | — | — |
| Kraton ® D1117 | — | — | — | — | ✓ | ✓ | ✓ | ✓ |
| Microcrystalline Wax (90° C. Melting Point) | 0% | 5% | 10% | 15% | 0% | 5% | 10% | 15% |
| Visc. @ about 150° C. (cPs) | 4,470 | 2,320 | 1,165 | 825 | 4,150 | 1,850 | 1,425 | 900 |
| 100 g Peel Values (° C.) | 64 | 65 | 64 | 67 | 47 | 48 | 49 | 50 |

I claim:

1. A hot melt adhesive useful for packaging, comprising:
   a) from about 10% to about 40% by weight of a radial styrene-isoprene-styrene block copolymer;
   b) up to about 20% of a compatible polymer, wherein the total polymer content does not exceed 40% by weight;
   c) from about 25% to about 60% by weight of at least one tackifying resin;
   d) from about 10% to about 40% by weight of at least one wax component; wherein the viscosity of the hot melt adhesive is less than about 1500 cPs at about 150° C.

2. A process of making the adhesive of claim 1 comprising the steps of:
   a) melting the adhesive components; and
   b) blending the adhesive components until smooth and homogeneous; wherein the melting and blending of each component may occur in any order of addition.

3. The adhesive of claim 1 wherein the temperature of application is less than about 150° C.

4. The adhesive of claim 1 wherein the radial styrene-isoprene-styrene block copolymer has the general configuration (pS-pI-pB)$_n$X or (pS-pI)$_n$X wherein n is a number greater than 2.

5. The adhesive of claim 1 wherein the tackifying resin is selected from the group consisting of rosins and rosin esters; terpenes and modified terpenes; and aliphatic, cycloaliphatic and aromatic hydrocarbon resins; their hydrogenated derivatives; and mixtures thereof.

6. The adhesive of claim 1 wherein the plasticizer is selected from the group consisting of naphthenic oil, paraffinic oil, polybutene, liquid elastomers, liquid tackifiers and mixtures thereof.

7. The adhesive of claim 1 wherein the wax component is selected from the group consisting of paraffin waxes, microcrystalline waxes, synthetic high melting point waxes, Fischer-Tropsch waxes, oxidized Fischer-Tropsch waxes and hydroxy stearamide waxes.

8. The adhesive of claim 1 wherein the adhesive contains up to about 25% by weight of a solid benzoate plasticizer.

9. The adhesive of claim 1 wherein the compatible polymer is selected from the group consisting of homopolymers, copolymers and terpolymers of ethylene, propylene and rubbery block copolymers and mixtures thereof.

10. The adhesive of claim 1 comprising from about 10% to about 20% by weight of a block copolymer; from about 2% to about 10% of an ethylene copolymer; from about 40% to about 50% of a tackifying resin selected from the group of aliphatic, cycloaliphatic and aromatic hydrocarbons and their hydrogenated derivatives and mixtures thereof; from about 20% to about 30% of at least one wax component; and from about 5% to about 15% of a liquid plasticizer.

11. The adhesive of claim 1 wherein the peels are greater than about 125° F. (about 52° C.).

12. A hot melt adhesive useful for packaging, comprising:
   a) from about 10% to about 40% by weight of a radial styrene-isoprene-styrene block copolymer having the general configuration (pS-pI-pB) or (pS-pI)$_n$X where pS is polystyrene, pI is polyisoprene, pB is polybutadiene, X is a residue of a multifunctional coupling agent and n is a number greater than 2 representing the number of branches appended to X which may also be referred to as arms;
   b) up to about 20% of a compatible polymer, wherein the total polymer content does not exceed 40% by weight;
   c) from about 25% to about 60% by weight of at least one tackifying resin; and
   d) from about 10% to about 40% by weight of at least one wax component.

13. The adhesive of claim 12 having a viscosity of less than about 5000 cPs at about 155° C.

* * * * *